(12) United States Patent
Yazici

(10) Patent No.: US 6,778,692 B1
(45) Date of Patent: Aug. 17, 2004

(54) IMAGE PROCESSING METHOD AND APPARATUS INCLUDING IMAGE IMPROVING CIRCUIT

(75) Inventor: Birsen Yazici, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 406 days.

(21) Appl. No.: 09/636,687

(22) Filed: Aug. 11, 2000

(51) Int. Cl.$^7$ ................................................ G06K 9/00
(52) U.S. Cl. ...................................... 382/132; 382/254
(58) Field of Search ........................... 382/128, 132, 382/264, 254, 274; 128/922; 378/98.2

(56) References Cited

U.S. PATENT DOCUMENTS

| | | | |
|---|---|---|---|
| 4,590,582 A | * 5/1986 | Umemura | 708/308 |
| 4,761,819 A | 8/1988 | Denison et al. | 382/54 |
| 5,051,902 A | * 9/1991 | Hishinuma | 382/263 |
| 5,173,776 A | * 12/1992 | Rigg et al. | 348/673 |
| 5,684,720 A | 11/1997 | Hein | 364/574 |
| 5,901,241 A | * 5/1999 | Koljonen et al. | 382/150 |
| 5,911,012 A | 6/1999 | Bernard et al. | 382/260 |
| 6,211,515 B1 | * 4/2001 | Chen et al. | 250/252.1 |
| 6,252,931 B1 | * 6/2001 | Aach et al. | 378/98.2 |

* cited by examiner

Primary Examiner—Leo Boudreau
Assistant Examiner—Ryan J. Miller
(74) Attorney, Agent, or Firm—Jean K. Testa; Patrick K. Patnode

(57) ABSTRACT

A method of improving images is provided. A body of image data is collected and signal to noise (SNR) values thereof are determined. The collected data is converted into an electronic image representation X. Image X comprises a first array of pixel intensity values. Further, a low pass filtered image representation F comprising a second array of pixel intensity values is obtained. An improved electronic image representation P comprising a third array of pixel intensity values is generated by replacing each pixel intensity value of electronic image representation X by a linear combination of the replaced pixel intensity value from image X and the corresponding pixel intensity value from image F. An array of linear combination coefficients α, (1–α) determine the relative contributions of the replaced X pixel intensity value and the value of the corresponding pixel intensity from image F, respectively. The values of linear combination coefficients array α are determined with respect to statistical image quality metrics, in particular with respect to signal-to-noise (SNR) ratio.

13 Claims, 4 Drawing Sheets

IMAGE PROCESSING METHOD AND APPARATUS INCLUDING IMAGE IMPROVING CIRCUIT

BACKGROUND OF THE INVENTION

The present invention relates to the art of image processing, and more particularly to image enhancement, image smoothing, and other image improvement techniques for image processing. Medical diagnostic images have commonly been subject to image degradation from noise, system imperfections, and the like. Various image processing techniques have been utilized to remove the effects of the noise. For example, one technique adjusts each pixel in accordance with the mean of surrounding pixels and the variance or difference between the surrounding pixels. Each filter enhanced pixel value g'(i,j) is a weighted average of the local mean and variance values:

$$g'(i,j)=\gamma(i,j)+k[g(i,j)-\gamma(i,j)]$$

where g(i,j) is the original unprocessed image, $\gamma(i,j)$ is a local mean, $g(i,j)-\gamma(i,j)$ is the variance, and k is a constant that weights the relative contributions therebetween. According to this technique, when k is set larger than 1, the variance or difference between the local mean value, hence the contribution of the measured gray scale level of the pixel g(i,j) is magnified. As k is set smaller, the image is smoothed or blurred as if acted upon by a low-pass filter. At the extreme at which k is set equal to zero, each pixel value is replaced by the local mean of the neighboring pixel values.

One of the drawbacks in this technique is the difficulty of selecting an appropriate value for the weighting factor k. The smaller k is set, the more the processed image is blurred and the more difficult it becomes to withdraw accurate diagnostic information from the processed image. As k is set larger, edges and fine details become enhanced. However, noise becomes enhanced at the same time. Frequently, in a medical image, the selected weighting factor k is too large for some regions and too small for other regions.

Other techniques involve setting the k for each pixel equal to the square root of the ratio of a preselected desirable local variance to the actual local variance of the selected pixel. Although this type of variable weighting factor can achieve better resultant images than the constant weighting factor, there is still room for improvement. In accordance with the present invention, an improved method for determining weighting coefficients for pixel intensity values is provided.

BRIEF SUMMARY OF THE INVENTION

A method of improving images is provided. A body of image data is collected and signal to noise (SNR) values thereof are determined. The collected data is converted into an electronic image representation X which comprises a first array of pixel intensity values. Further, a low pass filtered image representation F comprising a second array of pixel intensity values is obtained. An improved electronic image representation P comprising a third array of pixel intensity values is generated by replacing each pixel intensity value of electronic image representation X by a linear combination of the replaced pixel intensity value from image X and the corresponding pixel intensity value from image F. An array of linear combination coefficients, also referred to herein as weighting coefficients, $\alpha$, $(1-\alpha)$ determine the relative contributions of the replaced X pixel intensity value and the value of the corresponding pixel intensity from image F, respectively. The values of linear combination coefficients array $\alpha$ are determined with respect to statistical image quality metrics, in particular with respect to signal-to-noise (SNR) ratio. In one embodiment of the invention weighting coefficients are pre-determined based on known theoretical SNR for particular imaging apparatus and target SNR values (e.g., the Poisson distribution for x-ray images and Gaussian for MRI images). The predetermined coefficients are stored in a look up table. In another embodiment of the invention, the array of weighting coefficients $\alpha$ and $(1-\alpha)$ are computed based on the measured SNR of the replaced pixel from image X and target SNR values so as to achieve a desired target SNR for image P. Target SNR values are determined by experimentation and human visual perception studies.

DETAILED DESCRIPTION OF THE INVENTION

Figure 1:
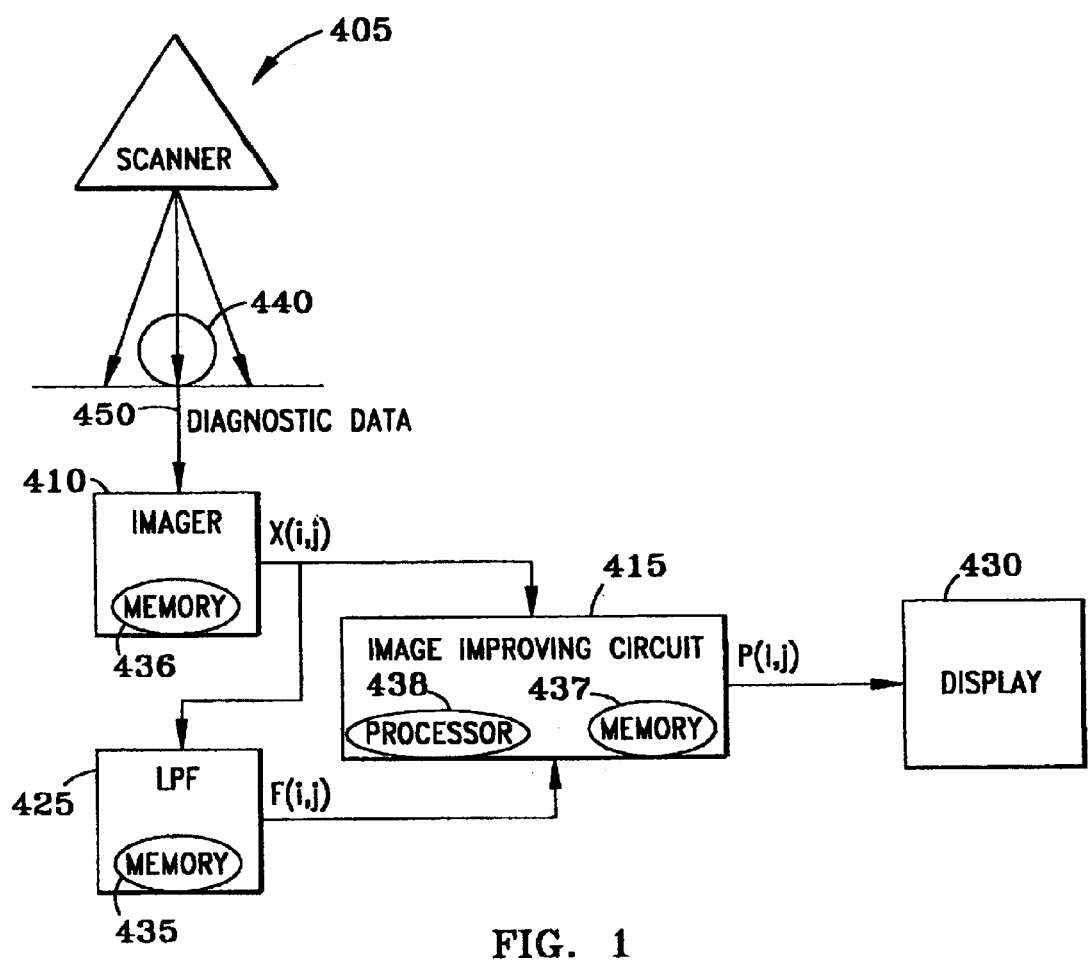
FIG. 1 is a block diagram of an image processing apparatus according to an embodiment of the invention.

As illustrated in FIG. 1, a medical diagnostic apparatus 405 generates medical diagnostic data 450, which has minor noise components. Imager 410 reconstructs medical diagnostic data 450 into an electronic image representation X comprising an array of digital pixel values X(i,j), i=1,...,H, j=1,...,W wherein (i,j) is the pixel location and H and W is the height and the width of the image, respectively X(i,j), i=1,...,H, j=1 are degraded by noise. Imager 410 includes an image memory 436 for storing the array of pixel values X(i,j).

A low pass filter circuit 425, including a memory 435, operates on the electronic image representation X to smooth the image, thus providing a low pass filtered image F, comprising an array of digital pixel values F(i,j). i=1,...,H, j=1,...,W. The Low pass filter is chosen such that low pass filtered image F preserves the coarse image content of image X while reducing the noise visibility. In one embodiment of the invention, the low pass filter is chosen such that the frequency components of the original image X are suppressed beyond a predetermined cut off frequency in order to eliminate noise frequencies above the cutoff frequency. In one embodiment of the invention the cutoff frequency is determined with respect to the smallest sized component of the image having diagnostic significance. In general, x-ray image components of diagnostic significance have frequency components of about 1.25 lp/mm. As those of ordinary skill in the art will recognize, this frequency varies for specific applications and situations. In one embodiment of the invention, a boxcar filter of size seven is used which suppresses the frequency components of X beyond about 1 line-pair/millimeter (lp/mm). In another embodiment of the invention, low pass filter 425 comprises a conventional wavelet low pass filter, such as Dabuchies 4 filter which suppresses the frequency components of the image X beyond about 1.5 lp/mm. In another embodiment, the low pass filtering operation is chosen such that, at nominal pixel brightness level, the noise power spectral density and the noise variance are converted to a desired power spectral density and variance level via linear low pass filtering. In a typical x-ray imaging system, the nominal pixel brightness level is 100. In one example, the power spectral density of the filtered image is set to correspond to white noise and the spectral variance of the filtered image is set to about 50% of that of image X. In another example, the power spectral density and variance of the filtered image are set to accommodate the preferences of the user, i.e., to match that of the user's previous system.

An image improving circuit 415 combines pixels X(i,j), i=1,...,H, j=1,...,W of electronic image representation X with corresponding pixel values F(i,j), i=,...,H, j=1,...,W of low pass filtered image F to provide a processed image P, including pixels P(i,j), i=1,...,H, j=1,...,W. Image improving circuit 415 includes processor 438 and memory 437. Processor 438 is programmed to combine X(i,j) and F(i,j) by replacing each pixel intensity value of electronic image representation X by a linear combination of the replaced pixel intensity value from image X and the corresponding pixel intensity value from image F. An array of weighting coefficients, also referred to herein as linear combination coefficients, α(i,j), (1−α(i,j)), i=1,...,H, j=1,...,W determine the relative contributions of the replaced X pixel intensity value and the value of the corresponding pixel intensity from image F, respectively. Accordingly, the resulting combined image P (referred to herein as processed image P) has improved image quality and viewability. The image P is then viewed on a display 430.

Although a digital x-ray imager is illustrated, alternative imagers suitable for the invention include computerized tomographic scanners (CTs,) conventional x-ray apparatus, positron emission scanners, nuclear cameras, and other diagnostic apparatus which generates data that is able to be reconstructed into an image representative of a region of an examined patient or subject 440.

Conventional image improvement circuits typically employ a linear low pass filtering operation which suppresses the high frequency content of an image. While there have been low pass filtering techniques which preserve high frequency content of an image, these have drawbacks. Unlike the present invention, conventional techniques are not based on imaging physics and/or widely accepted statistical x-ray image quality metrics such as signal to noise ratio. As a result, these conventional techniques do not yield good medical image quality. The present invention overcomes these shortcomings.

In the present invention, the processed image P is represented as a linear combination of the original image X and the low pass filtered image F in which the linear combination coefficient arrays α and 1−α are adapted on a pixel by pixel basis to minimize the loss of image details while reducing noise appearance. The processed image P is described by the relationship:

$P=\alpha(i,j)X(i,j)+[1-\alpha(i,j)]F(i,j),$ wherein: $\alpha(i,j)<1$, $i=1,\ldots,H$ and $j=1,\ldots,W$ In one embodiment of the invention, the values of linear combination coefficient array α are chosen with respect to SNR, a statistical image quality metric. For purposes of this specification, SNR is defined as follows:

SNR=Mean/Standard Deviation

In this embodiment, the values of the linear coefficient array cc are chosen so as to achieve a predetermined "target" SNR value for each pixel value.

For purposes of this specification, a "target" SNR is a predetermined SNR value that has been found to provide an image having a quality that meets user requirements. "Users" are individuals, e.g., medical professionals, who will perceive and interpret the images provided by the invention to diagnose medical conditions in patients. In general, a relatively high image SNR corresponds with more image detail and relatively higher image quality. However, visual image perception varies amongst individual users and further varies by application. Individual user selection of a preferred target SNR value depends strongly on the image perception and pattern recognition ability of the individual user. The quality of an image having a given target SNR is likely to be evaluated quite differently by different individual users. Therefore, in one embodiment of the invention, selection of a target SNR is accomplished by conducting visual perception studies with a population of users to determine the optimal SNR for that population. For example, in one such study, a target SNR of 10 for pixel intensity values of less than 50 was found to be optimal for a population of radiologists.

In one embodiment of the invention, the constant target SNR value is replaced by a target SNR curve in which the target SNR value of the pixels are based on user's preferences with respect to the pixel value or brightness levels. When the values of the target SNR curve are the same for all pixel values, the target SNR curve reduces to a single target SNR value. The target SNR curve is denoted by $Tr_{SNR}(p)$, $p=1,\ldots 8^L-1$ wherein p is the pixel value and L is the bit depth of the image.

In one embodiment of the invention, a target SNR curve, and the theoretical SNR curve of and x-ray image are used to select the values of the linear combination coefficient a so as to achieve the target SNR value for each pixel value.

Figure 3:
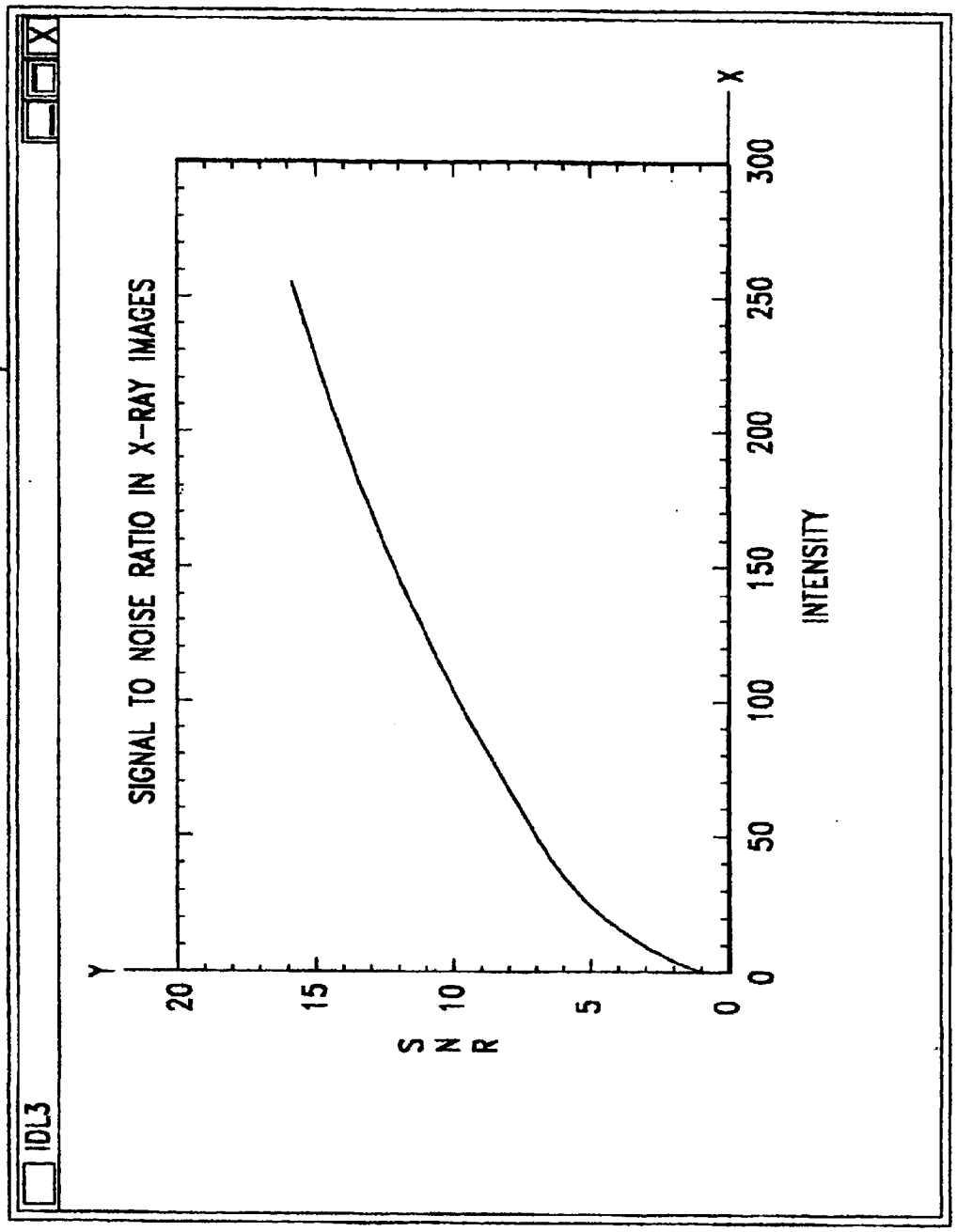
FIG. 3 is a graph illustrating the theoretical signal to noise ratio (SNR) versus pixel intensity values curve of an image provided by a typical X-ray imager.

The theoretical SNR curve of an x-ray image varies with the square root of the pixel intensity values due to Poisson distribution of the x-ray photon counting statistics. For example, an SNR curve 305 such as the one illustrated in FIG. 3 illustrates the relationship of a pixel's SNR to the pixel's intensity value p for a typical X-ray imager, including a digital X-ray imager. In FIG. 3, the SNR values are indicated along the y axis and pixel intensity values are indicated along the x axis for an 8 bit x-ray image in which the pixel intensity values vary between 0 and 255. The theoretical SNR curve is denoted by $Th_{SNR}(p)=\sqrt{p}$, $p=1,\ldots,8^L-1$ wherein p is the pixel value and L is the bit depth of the image.

In this embodiment, the values of the linear combination coefficient array are chosen as $\alpha(p)=Th_{SNR}(p)/Tr_{SNR}(p)$, $p=1,\ldots,8^L-1$ wherein p is the pixel value and L is the bit depth of the image.

Once a target SNR value or curve, e.g., a constant SNR value of 10, is determined, the pixel intensity values of image X are adjusted to provide a processed image P having pixel intensity values corresponding to the target SNR curve. Accordingly, for an x-ray implementation of the invention, for a relatively low X(i,j) pixel intensity value (low SNR), α is chosen to emphasize the corresponding low pass filtered F(i,j) pixel intensity value. This is because the low pass filtered pixel intensity value F(i,j), in that case, is likely to have a higher pixel intensity value and thus, a higher SNR. On the other hand, for a relatively high pixel intensity value of X(i,j) (high SNR), α is chosen to emphasize corresponding pixel X(i,j). Thus the SNR of the entire processed image P is increased. An example look up table illustrating values of α for corresponding ranges of pixel intensity values p for an embodiment of the invention is illustrated in Table 1.

Figure 2:
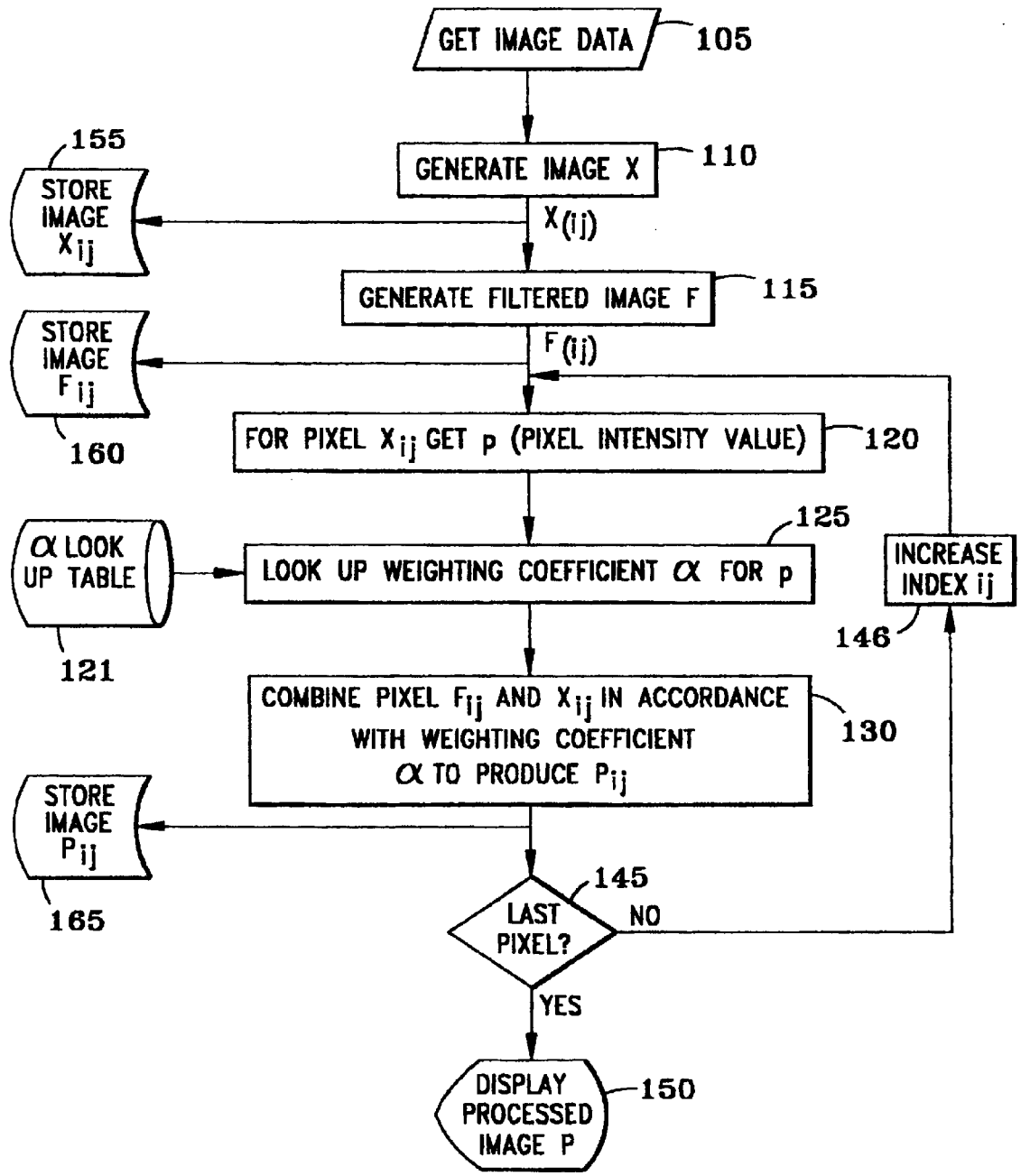
FIG. 2 is a flowchart illustrating the steps of a method for improving an image according an embodiment of the invention.

FIG. 2 illustrates the steps of the above method according to one embodiment of the invention. The steps illustrated in FIG. 2 are carried out by a processor, such as that illustrated in FIG. 1 at 438, programmed to execute the steps to provide an improved processed image P. First, image data is obtained from an imaging apparatus, for example, a digital x-ray apparatus such as that shown in FIG. 1 405, as illustrated in step 105. The image data is provided to an imager that generates (110) an image X including pixels X(i,j). In one embodiment of the invention, the image data is stored (155) in an image memory. Filtered image F, including pixels F(i,j) is generated by filtering image X with a low pass filter as shown in step 115. In one embodiment of the invention, image F is stored in a filtered image memory as shown in step 160.

As shown in step 120, pixel intensity values for respective pixels X(i,j) are determined. In one embodiment of the invention, an 8 bit image representation is employed. In that case, pixel intensity values range from 0 to 255. In step 125 a look up table 121 is referenced in order to adjust the pixel intensity values of image X in accordance with weighting coefficient a. The look up table 121 provides values of X(i,j) α(i,j) corresponding to ranges of measured pixel intensity values p. In step 130 pixels F(i,j)(1−α(i,j)) and corresponding pixels X(i,j) α(i,j) are combined in accordance with a to provide corresponding processed pixels P(i,j). The combined image is then stored (165) in an image memory. The steps are repeated until processed image P is complete. More specifically, the steps are repeated until the last pixel is processed (145). In one embodiment, if the last pixel has not been processed the index is increased (146). In another embodiment, if the last pixel has been processed the image is displayed (150).

Note that look up table 121 is generated off line and stored in memory for reference during execution of the method. Look up table 121 is based on upon known relationships between pixel intensity values p and target and theoretical SNRs for various imaging apparatus. This embodiment of the invention does not require computation of statistical quantities during image processing. The pixel values are adjusted with respect to theoretical and target statistical quantities via lookup tables for real time or off-line implementation Utilizing the relationship illustrated by curve 305, α values are selected such that pixels X(i,j) are combined with corresponding pixels F(i,j) such that processed pixels P(i,j) having the target SNR are provided. Accordingly, for an x-ray implementation of the invention, for a relatively low X(i,j) pixel intensity value (low SNR), α is chosen to emphasize the corresponding low pass filtered F(i,j) pixel intensity value. This is because the low pass filtered pixel intensity value F(i,j), in that case, is likely to have a higher pixel intensity value and thus, a higher SNR. On the other hand, for a relatively high pixel intensity value of X(i,j) (high SNR), α is chosen to emphasize corresponding pixel X(i,j). Thus the SNR of the entire processed image P is increased. An example look up table illustrating values of α for corresponding ranges of pixel intensity values p for an embodiment of the invention is illustrated in Table 1. As those of ordinary skill in the art will recognize, a variety of look up table configurations and techniques are suitable for implementing the invention. For example, in one embodiment of the invention, the relationship between α and p illustrated in Table 1 is implemented by constructing a 256×256 matrix of pixel values P(i,j) selectable by X(i,j) and F(i,j) wherein stored pixel values P(i,j) are correspond, to the desired o( for corresponding pixel values of X(i,j) and F(i,j). Various other look up table configurations are suitable for use in the invention, and all of these remain within the scope of the invention.

TABLE 1

$$\alpha(p) = \begin{cases} 0.3 & 0 \le p < 20 \\ 0.4 & 20 \le p < 40 \\ 0.5 & 40 \le p < 60 \\ 0.6 & 60 \le p < 80 \\ 0.8 & 80 \le p < 120 \\ 0.6 & 120 \le p < 140 \\ 0.8 & p \ge 140 \end{cases}$$

In another embodiment of the invention, target SNR values are achieved by first measuring the SNR of pixels of image X(i,j). This measurement is designated herein as $SNR(p)_{measured}$. $SNR(P)_{measured}$ is the measured SNR of the pixel's intensity value. Once SNR(p) of a pixel X(i,j) is determined, α is chosen for such that the combination of pixel X(i,j) and corresponding pixel F(i,j) will provide a pixel P(i,j) having the target SNR. This method is illustrated in FIG. 4.

Figure 4:
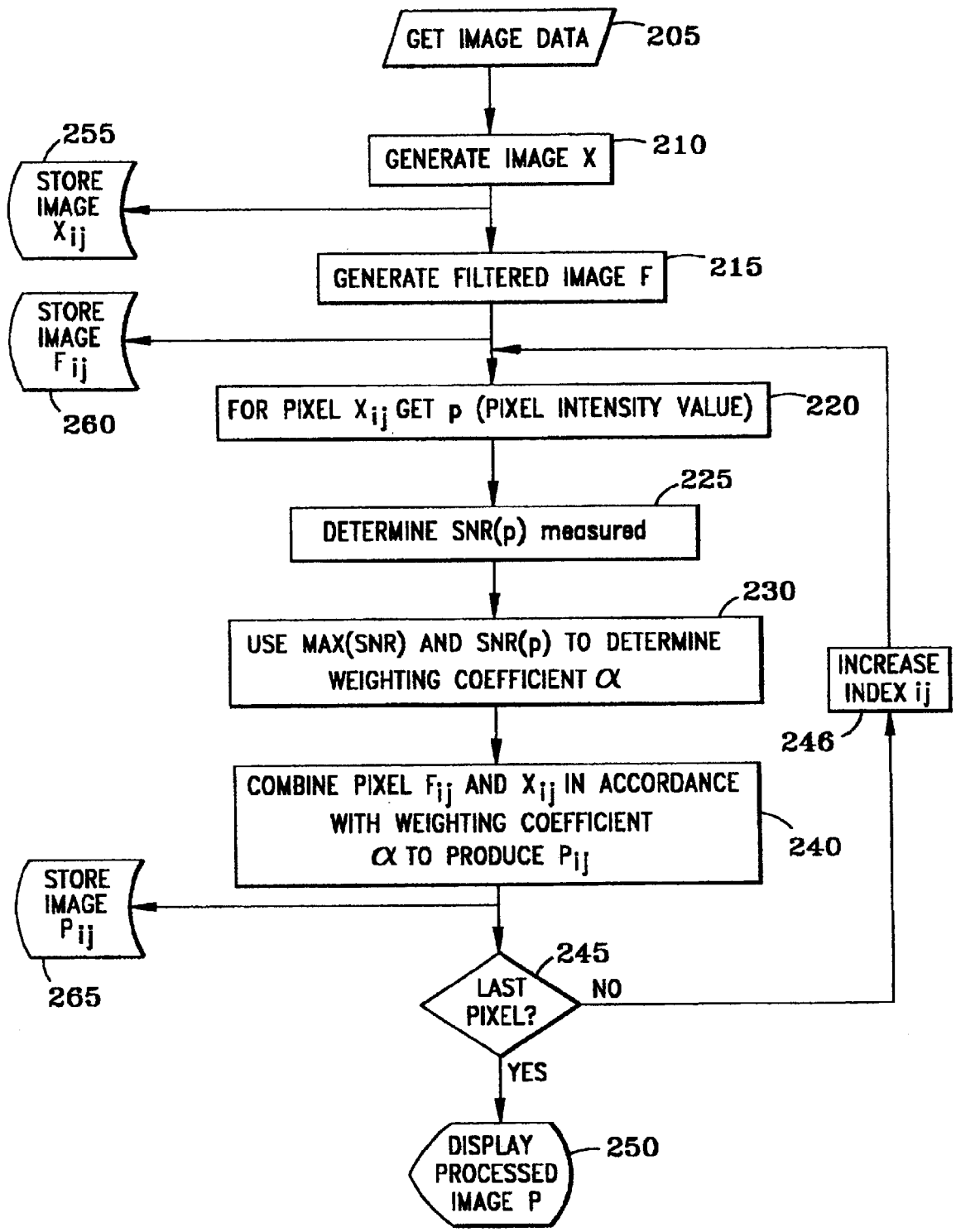
FIG. 4 is a flowchart illustrating the steps of a method for improving an image method according to an alternative embodiment of the invention.

The steps illustrated in FIG. 4 are carried out by a processor programmed to execute them in order to provide processed image P. First, image data is obtained from an imaging apparatus, for example, a digital x-ray apparatus as illustrated in step 205. The image data is provided to an imager that generates an image X including pixels X(i,j) as illustrated in step 210. In one embodiment of the invention, the image data is stored in an image memory as shown in step 255. Filtered image F, including pixels F(i,j) is generated by filtering image X with a low pass filter as shown in step 215. In one embodiment of the invention, image F is stored in a filtered image memory as shown in step 260. As shown in step 220, pixel intensity values for respective pixels X(i,j) are determined. In one embodiment of the invention, an 8 bit image representation is employed. In that case, pixel intensity values range from 0 to 255.

Next, as shown in step 225, the SNR of pixel intensity values for each pixel X(i,j) is measured according to the formula:

$$SNR_{measured}(P) = \text{Pixel value of } F(i,j)/\text{Standard Deviation of } X(i,j).$$

In one embodiment of the invention, the standard deviation of X(i,j) is given by the following local estimate:

$$\sqrt{\frac{1}{W_j W_i} \sum_{j=1}^{W_j} \sum_{i=1}^{W_i} (X(i,j) - F(i,j))^2}$$

where $W_j$ and $W_i$ are the size of the two-by-two local window in j and i directions, respectfully. The size of the window can be chosen such that large enough to get a good estimate of the local standard deviation and small enough to not blur the smallest diagnostically important objects in a medical image.

Next α is determined based upon the relationship of the measured SNR ( $SNR(p)_{measured}$) obtained in the previous step, and the target SNR curve. In one embodiment of the invention, α is determined by the relationship:

$$\alpha(p) = SNR(p)_{measured}/Tr_{SNR}(p)$$

In another embodiment of the invention, the target SNR value is set to a predetermined constant value. In an x-ray embodiment, this value is the square root of the maximum pixel intensity value $M_x$ in which case $\alpha(p)$ is determined by $$\alpha(p) = \sqrt{\frac{p}{M_x}}$$

where for an L bit image, p, and $M_x$ can range from $0-8^L-1$.

Once $\alpha$ is determined, pixels $F(i,j)$ and $X(i,j)$ are combined in accordance with $\alpha(p)$ to produce pixel $P(i,j)$ of the processed image P, as illustrated in step 240. The combined image is then stored 265 in an image memory. Steps 220, 230, 235, 240 and 246 are repeated until a final image P is provided. More specifically, the steps are repeated until the last pixel is processed (245). In one embodiment of the invention image P is then displayed 250 for viewing by an operator. Note that for the implementation of this embodiment of the invention, computation is performed to obtain the measured SNR of the image.

The invention has been described with reference to the preferred embodiment. Obviously, modifications and alterations will occur to others upon reading and understanding the preceding detailed description. It is intended that the invention be construed as including all such alterations and modifications insofar as they come within the scope of the appended claims or the equivalents thereof.

What is claimed is:

1. A method of processing an image comprising the steps of:

collecting medical diagnostic data;

converting said medical diagnostic data into a first electronic image representation which includes a first array of pixel intensity values $X(i,j)$;

converting said diagnostic data into a second electronic image representation which includes a second array of pixel intensity values $F(i,j)$; and linearly combining $X(i,j)$ and $F(i,j)$ on a pixel by pixel basis using an array $\alpha$, by combining $X(i,j)$ and $F(i,j)$ in accordance with weighting coefficients $\alpha(i,j)$ and $(1-\alpha(i,j))$ respectively, to generate a processed image comprising a third array of pixel intensity values $P(i,j)$ and wherein said weighting coefficients $\alpha(i,j)$ and $(1-\alpha(i,j))$, operate to combine $X(i,j)$ and $F(i,j)$ in accordance with the relationship:

$P=\alpha(i,j)X(i,j)+[1-\alpha(i,j)]F(i,j)$;

wherein: $\alpha(i,j)<1$, $i=1,\ldots,H$ and $j=1,\ldots,W$ and wherein F is the low pass filtered image and H and W are the height and width of the image, respectively;

wherein said weighting coefficient $\alpha(i,j)$ is selected so as to provide a processed image pixel $P(i,j)$ having a target SNR corresponding to a target SNR curve.

2. The method of claim 1 wherein said target SNR curve is determined by visual perception studies.

3. The method of claim 1 wherein said target SNR is a constant value of 10 for intensity values less than 50 for an x-ray image.

4. The method of claim 1 wherein the values of said weighting coefficients are based upon measured SNR values.

5. The method of claim 4 wherein said measured SNR values are calculated pixel by pixel based on average pixel value and pixel standard deviation.

6. The method of claim 5 wherein said average pixel value is obtained from said second electronic image representation.

7. The method of claim 4 wherein a pixel standard deviation of each pixel is obtained by a local variance estimator.

8. The method of claim 1 further comprising the step of displaying said processed image.

9. A method of providing a processed image from medical diagnostic data, the method comprising the steps of:

collecting medical diagnostic data;

converting said diagnostic data into a first electronic image representation which includes a first array of pixel intensity values $X(i,j)$;

converting the collected diagnostic data into a second electronic image representation which includes a second array of pixel intensity values $F(i,j)$;

determining the Signal to Noise Ratio (SNR(p) measured) of respective pixel intensity values $X(i,j)$;

selecting a target SNR for pixel intensity values $P(i,j)$ of said processed image; and linearly combining pixels $X(i,j)$ with corresponding pixels $F(i,j)$ on a pixel by pixel basis using an array $\alpha$, wherein at least one of $\alpha(i,j)$ is a different value than another $\alpha(i,j)$ such that the SNR of corresponding pixels $P(i,j)$ is the target SNR, wherein said linearly combining uses an array $\alpha$, by combining $X(i,j)$ and $F(i,j)$ in accordance with weighting coefficients $\alpha(i,j)$ and $(1-\alpha(i,j))$ respectively, to generate a processed image comprising a third array of pixel intensity values $P(i,j)$ and wherein said weighting coefficients $\alpha(i,j)$ and $(1-\alpha(i,j))$, operate to combine $X(i,j)$ and $F(i,j)$ in accordance with the relationship:

$P=\alpha(i,j)X(i,j)+[1-\alpha(i,j)]F(i,j)$;

wherein $\alpha(i,j)<1$, $i=1,\ldots,H$ and $i=1,\ldots,W$ and wherein F is the low pass filtered image and H and W are the height and width of the image, respectively;

wherein said weighting coefficient $\alpha(i,j))$ is selected so as to provide a processed image pixel $P(i,j)$ having a target SNR corresponding to a target SNR curve.

10. An image processing system comprising:

an imager adapted to provide a digital image representation of medical diagnostic data, said digital image representation including a first matrix of pixels $X(i,j)$;

a low pass filter adapted to provide a filtered digital image representation of said medical diagnostic data, said filtered digital image representation including a second matrix of pixels $F(i,j)$; and an image improving circuit including a processor programmed linearly to combine said first and second matrices on a pixel by pixel basis using an array $\alpha$, wherein at least one of $\alpha(i,j)$ is a different value than another $\alpha(i,j)$, to provide a processed image representation of said medical diagnostic data, said processed image representation comprising a third matrix of pixels $P(i,j)$ wherein said processor linearly combines using an array $\alpha$, by combining $X(i,j)$ and $F(i,j)$ in accordance with weighting coefficients $\alpha(i,j)$ and $(1-\alpha(i,j))$ respectively, to venerate a processed image comprising a third array of pixel intensity values $P(i,j)$ and wherein said weighting coefficients $\alpha(i,j)$ and $(1-\alpha(i,j))$, operate to combine $X(i,j)$ and $F(i,j)$ in accordance with the relationship:

$$P=\alpha(i,j)X(i,j)+[1-\alpha(i,j)]F(i,j);$$

wherein: $\alpha(i,j)<1$, $i=1,\ldots,H$ and $i=1,\ldots,W$ and wherein F is the low pass filtered image and H and W are the height and width of the image, respectively; wherein said weighting coefficient α(i,j) is selected so as to provide a processed image pixel P(i,j) having a target SNR corresponding to a target SNR curve.

11. The system of claim 10 wherein said low pass filter is a boxcar filter.

12. The system of claim 11 wherein said boxcar filter is a seven by seven boxcar filter.

13. The system of claim 10 wherein said low pass filter is a wavelet filter.

* * * * *